United States Patent
Miyazaki

(10) Patent No.: US 11,945,051 B2
(45) Date of Patent: Apr. 2, 2024

(54) HEATER SENSOR COMPLEX AND SOLDERING IRON TIP CARTRIDGE

(71) Applicant: HAKKO CORPORATION, Osaka (JP)

(72) Inventor: Mitsuhiko Miyazaki, Osaka (JP)

(73) Assignee: HAKKO CORPORATION, Osaka (JP)

( * ) Notice: Subject to any disclaimer, the term of this patent is extended or adjusted under 35 U.S.C. 154(b) by 0 days.

(21) Appl. No.: 18/115,163

(22) Filed: Feb. 28, 2023

(65) Prior Publication Data

US 2023/0321742 A1 Oct. 12, 2023

(30) Foreign Application Priority Data

Apr. 8, 2022 (JP) ................. 2022-064582

(51) Int. Cl.
*B23K 3/03* (2006.01)
*B23K 3/047* (2006.01)

(52) U.S. Cl.
CPC ............ *B23K 3/033* (2013.01); *B23K 3/0353* (2013.01); *B23K 3/0478* (2013.01)

(58) Field of Classification Search
CPC ..... B23K 3/033; B23K 3/0353; B23K 3/0478
See application file for complete search history.

(56) References Cited

U.S. PATENT DOCUMENTS

| | | | |
|---|---|---|---|
| 2,735,923 A * | 2/1956 | Juvinall | B23K 3/033 219/241 |
| 5,094,384 A * | 3/1992 | Urban | B23K 3/0338 76/1 |
| 5,122,637 A | 6/1992 | Bottorff et al. | |
| 6,054,678 A | 4/2000 | Miyazaki | |
| 9,700,951 B2 | 7/2017 | Matsuzaki et al. | |
| 11,273,509 B2 | 3/2022 | Matsuzaki et al. | |
| 2010/0187205 A1 | 7/2010 | Masaki | |
| 2017/0368627 A1* | 12/2017 | Shigekawa | B23K 3/033 |
| 2019/0299311 A1* | 10/2019 | Mochizuki | B23K 3/033 |

(Continued)

FOREIGN PATENT DOCUMENTS

| | | |
|---|---|---|
| EP | 1086772 A2 | 3/2001 |
| JP | H10-260083 A | 9/1998 |
| JP | H10260083 A * | 9/1998 |

(Continued)

*Primary Examiner* — Dana Ross
*Assistant Examiner* — Kuangyue Chen
(74) *Attorney, Agent, or Firm* — Procopio, Cory, Hargreaves & Savitch LLP

(57) ABSTRACT

A heater-sensor complex 10 includes a heating wire 12, a lead wire 14 which is made from the same metal of the heating wire 12 and connected to the proximal end of the heating wire 12, the lead wire 14 having a bigger diameter than the heating wire 12, a non-heating wire 16 constituted by a different metal from the metal constituting the heating wire 12, and a sensor head 18 constituted by a metal different from the metal constituting the heating wire 12 or the metal constituting the non-heating wire 16. The sensor head 18 have a lower thermal conductivity than the non-heating wire. To the sensor head 18, the distal end of the heating wire 12 and the distal end of the non-heating wire is connected. The heating wire 12 and the non-heating wire 16 electrically conducts at least through the sensor head 18.

11 Claims, 11 Drawing Sheets

(56) References Cited

U.S. PATENT DOCUMENTS

2020/0030902 A1\* 1/2020 Matsuzaki ............. B23K 3/033

FOREIGN PATENT DOCUMENTS

| JP | 2001-121260 | A | 5/2001 |
|----|-------------|-----|---------|
| JP | 6060280 | B2 | 1/2017 |
| JP | 2018-096759 | A | 6/2018 |
| JP | 6963307 | B2 | 11/2021 |
| WO | 2010-084946 | A1 | 7/2010 |

\* cited by examiner

HEATER SENSOR COMPLEX AND SOLDERING IRON TIP CARTRIDGE

CROSS-REFERENCE TO RELATED APPLICATIONS

This application is based on and claims priority under 35 USC 119 from Japanese Patent Application No. 2022-064582 filed on Apr. 8, 2022, the contents of which are incorporated herein by reference.

TECHNICAL FIELD

This disclosure relates to a heater sensor complex and a soldering iron tip cartridge.

BACKGROUND ART

A heater-sensor complex used for a soldering tip cartridge of a soldering iron is known. As shown in FIG. 13, a heater-sensor complex disclosed in JPH10-260083A, has a configuration in which a distal end 83a of a heating wire 83 and a distal end 85a of a non-heating wire 85 are joined together. On the proximal end of the heating wire 83, a lead wire 82 having a larger diameter than the heating wire 83 is connected. The heating wire 83 and the lead wire 82 are made of iron-chromium alloy, and the non-heating wire 85 is made of nickel or nickel-chromium alloy. The heating wire 83 is provided with a coil portion 81, and when a voltage is applied between the lead wire 82 and the non-heating wire 85, the heating wire 83 generates heat. At this time, the joint between the distal end 83a of the heating wire 83 and the distal end 85a of the non-heating wire 85 functions as a temperature detection.

In the soldering iron using the heater sensor complex disclosed in JPH10-260083A, in order to maintain the soldering tip at a constant temperature, temperature control may be performed by pulse voltage repeatedly applied between the lead wire 82 and the non-heating wire 85, the pulse voltage depending on the temperature calculated from the thermo-electromotive force between the lead wire 82 and the non-heating wire 85. From continuous research, it was found that when the pulse voltage is applied between the lead wire 82 and the non-heating wire 85, the electromotive force generating between the lead wire 82 and the non-heating wire 85 by Seebeck effect rises instantaneously. That is, it is assumed that when the pulse voltage is applied, the temperature of the joint of the distal end 83a of the heating wire 83 and the distal end 85a of the non-heating wire 85 rises instantaneously, causing an instantaneous rise in the electromotive force. Therefore, when pulse voltage control is performed to adjust the temperature of the soldering tip to a predetermined temperature, it may adversely affect the temperature control of the soldering tip.

SUMMARY OF INVENTION

An aspect of the present disclosure relates to provide a heater sensor complex that can improve the accuracy of temperature control in the heater-sensor complex.

According to the aspect of the present disclosure, there is provided a heater sensor complex including: a heating wire which generates heat when power is supplied, a lead wire constituted by a metal identical to a metal constituting said heating wire and connected to a proximal end of said heating wire, said lead wire having a bigger diameter than said heating wire, a non-heating wire constituted by a metal different from the metal constituting said heating wire, a sensor head constituted by a metal different from the metal constituting said heating wire and the metal constituting said non-heating wire. Said sensor head has a lower thermal conductivity than said non-heating wire. Said sensor head is joined to a distal end of said heating wire and a distal end of said non-heating wire, and said heating wire and said non-heating wire are conducted through at least said sensor head.

In the heater-sensor complex according to the present disclosure, when a voltage is applied between the lead wire and the non-heating wire, the heating wire and the non-heating wire are energized at least through the sensor head. At this time, the heating wire generates heat and the heater-sensor complex functions as a heater. Also, the heating wire and the non-heating wire are made of different metals. Therefore, when the heating wire is heated, a thermo-electromotive force corresponding to the temperature difference between the distal end of the heating wire and the distal end of the non-heating wire, and the proximal end of the lead wire and the proximal end of the non-heating wire, is generated between the proximal end of the lead wire and the proximal end of the non-heating wire. Based on the magnitude of this thermo-electromotive force, the temperature of the distal end of the heating wire and the distal end of the non-heated wire can be derived. That is, the distal end of the heating wire and the distal end of the non-heating wire which in turn is the sensor head, function as temperature detection end. At this time, since the heating wire and the non-heating wire are conducted at least through the sensor head (the sensor head made from a metal having a lower thermal conductivity than the metal constituting the non-heating wire), when pulse voltage is applied between the lead wire and the non-heating wire, an instantaneous increase in electromotive force (instantaneous temperature increase) accompanied by applying the pulse voltage, is mitigated. Therefore, the instantaneous temperature rise of the sensor head is also mitigated, and the accuracy of temperature control of the heater-sensor complex is improved.

That is, in the case of a heater-sensor complex in which a non-heating wire is directly connected to a heating wire, an instantaneous temperature rise (sensor temperature) occurs at the joint (connection of the heating wire and the non-heating wire) when pulse voltage is applied. As a result, an instantaneously increased electromotive force occurs between the proximal end of the lead wire and the proximal end of the non-heated wire. Therefore, during temperature control, an instantaneous rise in the sensor temperature may adversely affect the temperature control of the heater-sensor complex. In contrast, in the heater-sensor complex of the present disclosure, the heating wire and the non-heating wire are conducted at least through the sensor head, so the instantaneous rise of the sensor temperature (instantaneous rise in electromotive force) when pulse voltage is applied is mitigated. Therefore, temperature control can be performed while mitigating the influence of an instantaneous rise in sensor temperature (instantaneous increase in electromotive force). Therefore, the accuracy of temperature control of the heater-sensor complex can be improved. If the heating wire and the non-heating wire are electrically connected through the sensor head, a part of the current flowing between the heating wire and the non-heating wire may flow directly through the heating wire and the non-heating wire without passing through the sensor head.

Said heating wire may include a coil portion formed in a coiled shape. In this case, a first joint, which is a portion jointed to said sensor head, of said distal end of said heating wire and a second joint, which is a portion jointed to said sensor head, of said distal end of said non-heating wire may both be positioned on a distal side of the heater sensor complex than said coil portion.

In this aspect, when the coil portion generates heat, the first joint and the second joint are arranged in the region of the same temperature zone. Therefore, from the value of the thermo-electromotive force generated between the lead wire and the non-heating wire, the temperature of the first joint and the second joint can be accurately obtained.

At least one of a first joint, which is a portion jointed to said sensor head, of said distal end of said heating wire and a second joint, which is a portion jointed to said sensor head, of said distal end of said non-heating wire may be positioned on an outer peripheral surface of said sensor head.

In this aspect, the joint configuration of the heating wire or the non-heating wire with respect to the sensor head may be easily made. Further, it may easily ensure to keep the distance between the first joint and the second joint so these will not contact each other.

Said heating wire may include a coil portion formed in a coiled shape around an insulation tube. In this case, the non-heating wire may be inserted through said insulation tube. Said sensor head may have a width wider than said insulation tube.

In this aspect, the heat capacity of the sensor head may be increased. Therefore, the function to mitigate the instantaneous rise in sensor temperature by the sensor head is effectively performed. In addition, since the coil portion is isolated from the non-heating wire by the insulation tube, short-circuiting between the heating wire and the non-heating wire can be prevented.

Said heating wire may include a coil portion formed in a coiled shape. In this case, a space may be formed between said sensor head and said coil portion, and said heating wire may have an extending portion extending from an end of said coil portion to said distal end of said heating wire.

In this aspect, the heat generation of the coil portion is less likely to influence the sensor head, while keeping the connection of the heating wire to the sensor head.

A joint surface may be formed on an outer peripheral surface of said sensor head, the joint surface may be configured flat in form, where said distal end of said heating wire or said distal end of said non-heating wire is connected to said joint surface.

In this aspect, the connection of the heating wire or the non-heating wire to the sensor head may be ensured.

Said non-heating wire may be made from nickel or nickel alloys. Said sensor head may be made from stainless steel or heat-resistant steel.

The soldering iron tip cartridge according to this disclosure includes a soldering tip, said heater sensor complex incorporated to said soldering tip, and a housing coupled to said soldering tip to accommodate said heater sensor complex.

The soldering iron tip cartridge according to this disclosure includes a soldering tip, said heater sensor complex incorporated to said soldering tip, and a housing coupled to said soldering tip to accommodate said heater sensor complex. Said soldering tip has a cylindrical sleeve defining an inner hole, and a soldering tip-end formed on a distal end of said sleeve so as to close one end of said inner hole of said sleeve. Said coil portion is positioned inside said inner hole. Said first joint and said second joint are arranged at a position on a distal side of the heater sensor complex than said coil portion and in a region having a same temperature zone when said coil portion generates heat.

In this soldering iron tip cartridge, the coil portion of the heating wire is arranged in the inner hole of the sleeve of the soldering tip, the first joint and the second joint are respectively positioned on the distal side than the coil portion, and further, the first joint and the second joint are arranged in the region that is in the same temperature zone when the coil portion generates heat. Therefore, when voltage is applied, the temperature of the first joint and the temperature of the second joint are in the region having the same temperature zone, so the accuracy of temperature control can be further improved.

The soldering iron tip cartridge according to this disclosure includes a soldering tip, said heater sensor complex attached to said soldering tip, and a housing coupled to said soldering tip to accommodate said heater sensor complex. Said soldering tip has a cylindrical sleeve defining an inner hole, and a soldering tip-end formed on a distal end of said sleeve so as to close one end of said inner hole of said sleeve. At least one of said distal end of said heating wire and said distal end of said non-heating wire is positioned in a gap formed between said joint surface configured flat in form and an inner peripheral surface of said sleeve defining said inner hole.

With this soldering iron tip cartridge, the size of the sensor head can be ensured while keeping a space for arranging the distal end of the heating wire or the distal end of the non-heating wire. Also, it is possible to suppress the size of the sleeve increasing.

As described above, according to the present disclosure, it is possible to improve the accuracy of temperature control in a heater-sensor complex.

DESCRIPTION OF EMBODIMENTS

Figure 1:
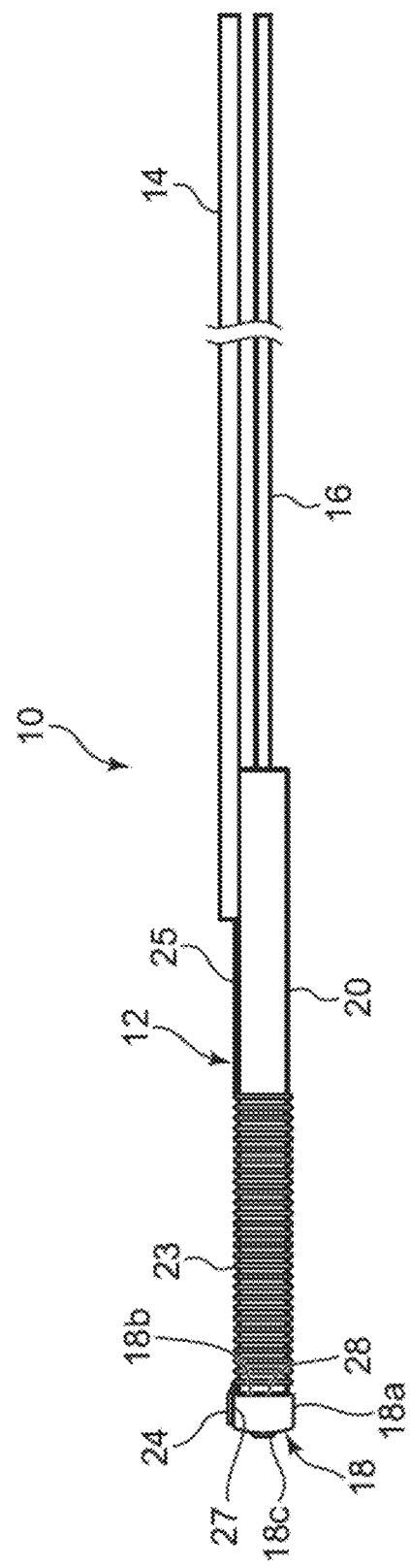
FIG. 1 shows a heater sensor complex according to an embodiment

Hereinafter, the detail embodiment for implementing this disclosure is explained referring to the drawings.

As shown in FIG. 1, the heater sensor complex 10 according to this embodiment includes a heating wire 12, a lead wire 14, a non-heating wire 16, a sensor head 18, and an insulation tube 20. The distal end of the heating wire 12 and the distal end of the non-heating wire 16 are connected to the sensor head 18. The metal forming the heating wire 12, non-heating wire 16, and sensor head 18 are formed from different metals. Therefore, between the heating wire 12 and the non-heating wire 16, due to the Seebeck effect, an electromotive force corresponding to the temperature difference of the temperature of the distal end of the heating wire 12 and the distal end of the non-heating wire 16 (the temperature of the sensor head 18), and the temperature of the proximal end of the lead wire 14 and the proximal end of the non-heating wire 16, is generated. That is, the distal end of the heating wire 12 and the distal end of the non-heating wire 16, accordingly the sensor head 18, will function as a temperature detection end (sensor portion) in the heater sensor complex 10.

The metal forming the heating wire 12 and the metal forming the lead wire 14 are the same metal. The heating wire 12 and the lead wire 14 are made of iron-chromium alloy wire. For example, the heating wire 12 may be made from a "Kanthal" brand wire available from Sandvik Material Technology of Sweden. The heating wire 12 preferably has a diameter of 0.1 mm or more and 0.5 mm or less. Other than iron-chromium alloy, the heating wire 12 may be made from a chromium alloy (for example, a nickel-chromium alloy).

The non-heating wire 16 is preferably formed from a nickel material having a diameter of 0.2 mm to 0.8 mm, and more preferably 0.7 mm, although larger diameter wires can be used. That is, the diameter of the non-heating wire 16 is bigger than the heating wire 12. The non-heating wire 16 is made from a nickel or a nickel alloy wire.

The sensor head 18 is made of stainless steel (SUS). That is, the sensor head 18 is made from a metal different from the metal forming the heating wire 12 and the metal forming the non-heating wire 16. Moreover, the sensor head 18 is made from a metal having a thermal conductivity lower than that of the metal forming the non-heating wire 16. In order to mitigate the instantaneous effect of heat generation, the sensor head 18 is preferably made from a metal that conducts heat slowly than a metal with a high thermal conductivity such as copper. That is, the sensor head 18 is preferably made from a metal with a low thermal conductivity. Moreover, the sensor head 18 is made from a metal having an electrical resistivity lower than that of the heating wire 12, and in addition, the sensor head 18 has a larger cross-sectional area than the heating wire 12 and the non-heating wire 16. Therefore, it is unlikely for the sensor head 18 to generate heat with the amount of electricity that causes the heating wire 12 to generate heat. The sensor head 18 may also be made from a heat resistant steel (SUH).

The thermal conductivity of the non-heating wire 16 is preferably 70 to 90 W/m·K. In contrast, the thermal conductivity of the sensor head 18 is preferably 10 to 50 W/m·K, more preferably 10 to 20 W/m·K. That is, the thermal conductivity of the sensor head 18 is lower than that of the non-heating wire 16.

The heating wire 12 includes a heater coil 23, an extending portion 24 positioned on the distal side of the heater sensor complex 10 (the left side in FIG. 1, the sensor head 18 side) than the coil portion 23, and a proximal extending portion 25 positioned on the proximal side (the right side in FIG. 1) than the coil portion 23.

The heater coil 23 is a portion of the heating wire 12 wound around the insulation tube 20 in a coiled shape, and generates heat when electric power is supplied. One end (proximal end) of the coil 23 is arranged substantially at a central position of the insulation tube 20 in the axial direction of the insulating tube 20. The other end side (distal end) of the coil 23 is arranged close to the end (distal end) of the insulation tube 20 in the axial direction of the insulation tube 20.

The extending portion 24 extends from one end (distal end) of the coil 23 in the axial direction of the insulating tube 20. The extending portion 24 distally extends over the end of the insulation tube 20, and includes a portion joint to the sensor head 18. This portion comprise the distal end of the heating wire 12. The sensor head 18 is located away from the coil portion 23 so that a gap is formed between the sensor head 18 and the coil portion 23. Therefore, the heating wire 12 has an extending portion 24 extending from the coil portion 23 and is jointed to the sensor head 18 via the extending portion 24.

The distal end of the heating wire 12 is welded to the outer peripheral surface 18a of the sensor head 18 formed in the shape of a flat block. That is, the sensor head 18 has a first end face 18b facing the insulation tube 20 side, a second end face 18c facing the opposite side of the first end face 18b, and an outer peripheral surface 18a connecting the peripheral edge of the first end face 18b and the peripheral edge of the second end face 18c. The distal end of the heating wire 12 is joint to the outer peripheral surface 18a of the sensor head 18. Hereinafter, the joint of the heating wire 12 to the sensor head 18 is referred to as a first joint. The first end face 18b and the second end face 18c have a width wider than the width of the insulating tube 20. That is, the width of the first end face (and the second end face) in the direction perpendicular to the axial direction of the insulation tube 20 is larger than the width of the insulating tube 20.

The proximal extending portion 25 is arranged along the outer peripheral surface of the insulating tube 20 and extends from one end (proximal end) of the coil 23 along the axial direction of the insulating tube 20. The lead wire 14 is connected to the proximal end of the proximal extending portion 25.

The lead wire 14 is connected to the proximal end of the heating wire 12. The lead wire 14 is connected to a proximal extending portion 25 of the heating wire 12, and extends in the axial direction of the insulation tube 20 along the outer peripheral surface of the insulation tube 20, further extending to the proximal side (right side in FIG. 1) over the proximal end of the insulation tube 20. The lead wire 14 preferably has a diameter of 0.7 mm or more and 2.0 mm or less, or a diameter of 2 times or more and 4 times or less the diameter of the heating wire 12. That is, the lead wire 14 has a larger diameter than the heating wire 12. With this configuration, when power is applied from a power source (not shown), at least the heater coil 23 of the heating wire 12 generates heat, while the lead wire 14 does not generate heat.

The non-heating wire 16 is inserted inside the insulation tube 20 and extends further from the proximal end of the insulation tube 20 (the right end in FIG. 1) toward the proximal side (the right side in FIG. 1). The distal end of the insulation tube 20 (the left end in FIG. 1) may be in contact with the first end face 18*b* of the sensor head 18.

Figure 2:
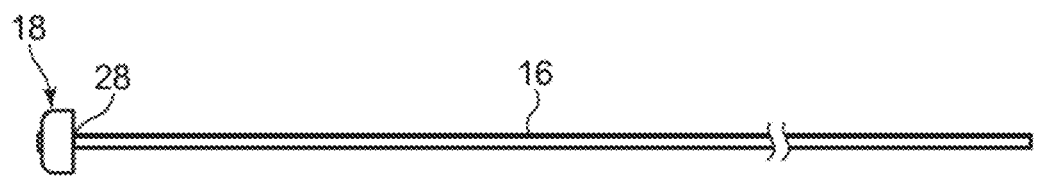
FIG. 2 shows a joint relation of the sensor head and the non-heating wire according to the embodiment.

As shown in FIG. 2, the distal end of the non-heating wire 16 is connected to the first end face 18*b* of the sensor head 18. Hereinafter, the joint of the non-heating wire 16 to the sensor head 18 is referred to as a second joint 28. The distal end of the non-heating wire 16 is welded and fixed to the sensor head 18.

Therefore, the first joint 27 which is the joint of the heating wire 12 to the sensor head 18, and the second joint 28 which is the joint of the non-heating wire 16 to the sensor head 18, are separated from each other. Therefore, when voltage is applied between the heating wire 12 and the non-heating wire 16, the heating wire 12 and the non-heating wire 16 electrically conduct at least through the sensor head 18. Here, if the condition of the heating wire 12 and non-heating wire 16 electrically conducting through the sensor head 18 is ensured, the heating wire 12 and the non-heating wire 16 may partially be in direct contact where the flowing current may partially flow directly between the heating wire 12 and the non-heating wire 16 without going through the sensor head 18.

Figure 3:
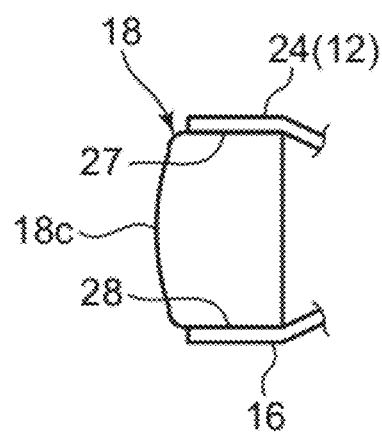
FIG. 3 shows a joint relation of the sensor head and the heating wire and the non-heating wire according to another embodiment.
Figure 4:
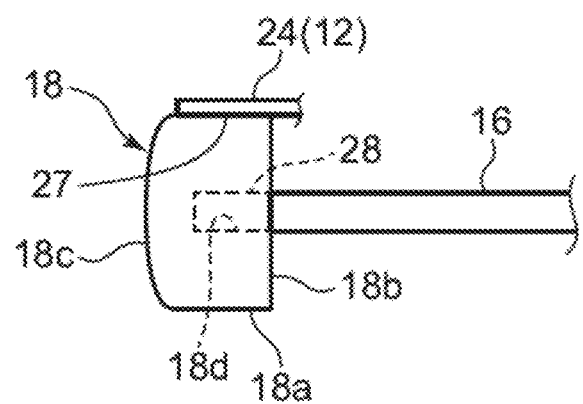
FIG. 4 shows a joint relation of the sensor head and the heating wire and the non-heating wire according to another embodiment.

The non-heating wire 16 is not limited to the structure fixed to the first end surface 18*b* of the sensor head 18. As shown in FIG. 3, the distal end of the non-heating wire 16 may be connected to the outer peripheral surface 18*a* of the sensor head 18, on the side opposite to the first joint 27 where the distal end of the heating wire is connected. When the non-heating wire 16 is connected to the outer peripheral surface 18*a* of the sensor head 18, the heating wire 12 may be connected to a surface of the sensor head 18 different from the outer peripheral surface 18*a*. Further, as shown in FIG. 4, the sensor head 18 may have a hole 18*d* piercing the first end face 18*b*, and the non-heating wire 16 may be connected to the sensor head 18 while inserted into the hole 18*d*. The hole 18*d* may be configured as a hole piercing all the way through the sensor head 18 itself, or may be configured as a hole with a bottom only piercing the first end face but not the second end face as shown in FIG. 4.

Figure 5:
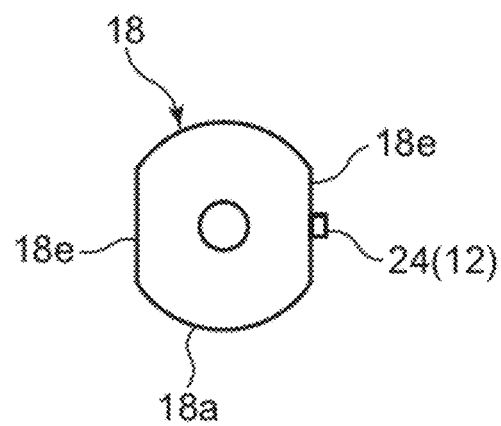
FIG. 5 describes the configuration of the sensor head according to the embodiment.

As shown in FIG. 5, the outer peripheral surface 18*a* of the sensor head 18 is formed with a joint surface 18*e* configured as a flat surface, and the distal end of the heating wire 12 is fixed to this joint surface 18*e*. Since the flat joint surface 18*e* is also formed on the opposite side of the joint surface 18*e* which the distal end of the heating wire 12 is fixed, the distal end of the non-heating wire 16 may be fixed to this opposite side joint surface. Besides the joint surface 18*e*, the outer peripheral surface 18*a* of the sensor head 18 is configured of a curved surface. Although FIG. 5 shows the sensor head 18 formed with a pair of joint surfaces 18*e*, one of the joint surface 18*e* may be omitted. Alternatively, the flat joint surface 18*e* itself may be omitted, and the distal end of the heating wire 12 may be connected to the curved outer peripheral surface 18*a*.

Figure 6A:
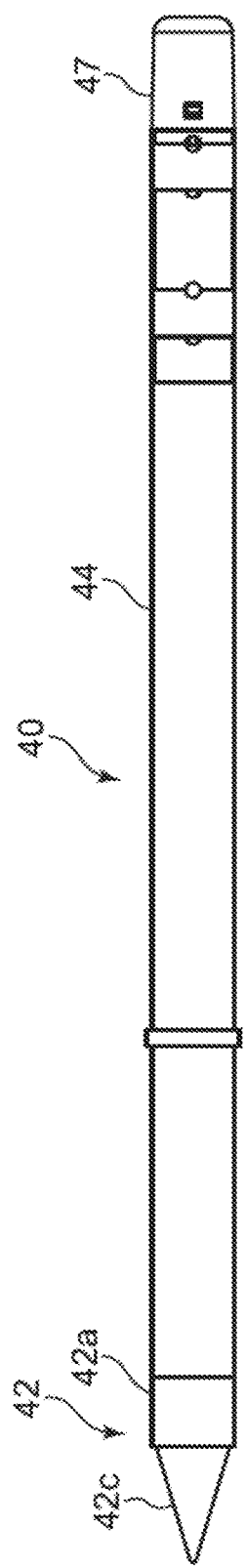
FIGS. 6A and 6B show figures of a standard type soldering iron tip cartridge with the heater sensor complex applied according to the embodiment.
Figure 6B:
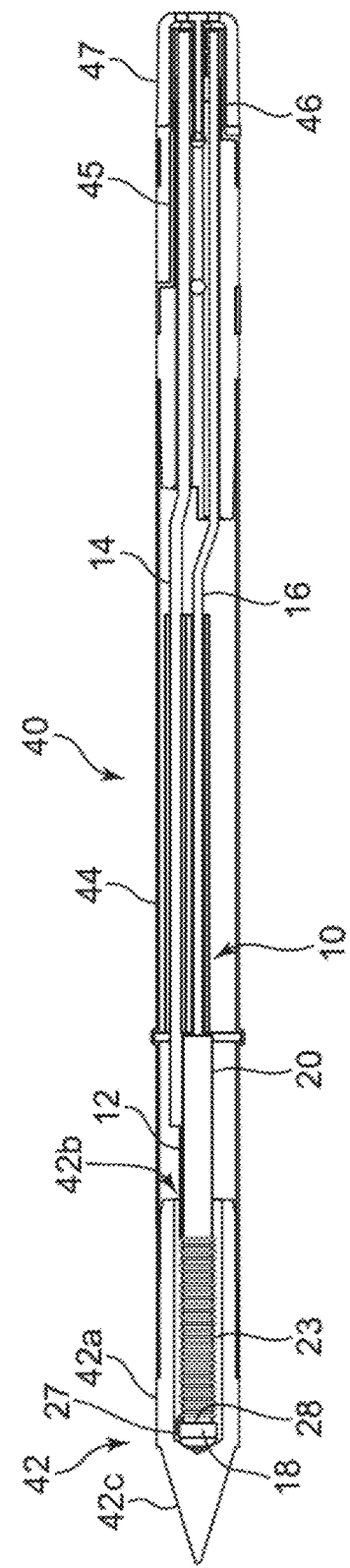

As shown in FIGS. 6A and 6B, the heater-sensor complex 10 may be used in a tip cartridge 40 of a soldering iron. The soldering iron tip cartridge 40 is used by attaching it to a handle (not shown) of a soldering iron. A thermistor is located in the handle, and the temperature obtained from the thermo-electromotive force generated between the lead wire 14 and the non-heating wire 16 can be compensated with the temperature detected by the thermistor (reference junction compensation). The handle is electrically connected to a controller (not shown), which controls the pulse voltage applied to the tip cartridge 40.

The tip cartridge 40 includes a soldering tip 42, a heater-sensor complex 10 assembled into the tip 42, and a housing 44 coupled to the tip 42 to store the heater-sensor complex 10.

The soldering tip 42 is made by a metal having high thermal conductivity such as copper, iron, or iron alloy. The tip 42 have a cylindrical sleeve 42*a* defining an inner hole 42*b*, and a soldering tip-end 42*c* which is a portion for melting solder, formed on the distal side of the sleeve 42*a* as closing one end of the inner hole 42*b* of the sleeve 42*a*.

In the sleeve 42*a*, the heater-sensor complex 10 is stored so the heater coil 23 is stored in the inner hole 42*b* of the sleeve 42*a*. That is, the heater coil 23 is positioned inside the inner hole 42*b* of the sleeve 42*a*. Between the heating wire 12 including the coil portion 23, and the sleeve 42*a* are insulated. When power is supplied to the heating wire 12 and heater coil 23 generates heat, the soldering tip 42 having the sleeve 42*a* is heated to a temperature up to a temperature where solder can be melted.

The sensor head 18 is located on the deeper side (distal side) than the coil portion 23 inside the inner hole 42*b* of the sleeve 42*a*. In other words, both the first joint 27 (heating wire 12 to the sensor head 18) and the second joint 28 (non-heating wire 16 to the sensor head 18) are located on the deeper side (distal side) than the coil portion 23. Therefore, when the heater coil 23 generates heat, the first joint 27 and the second joint 28 will belong to the region in the same temperature zone. Therefore, the first joint 27 which is the connection of the heating wire 12 to the sensor head 18, and the second joint 28, which is the connection of the non-heating wire 16 to the sensor head 18, can function as one thermocouple.

Figure 7:
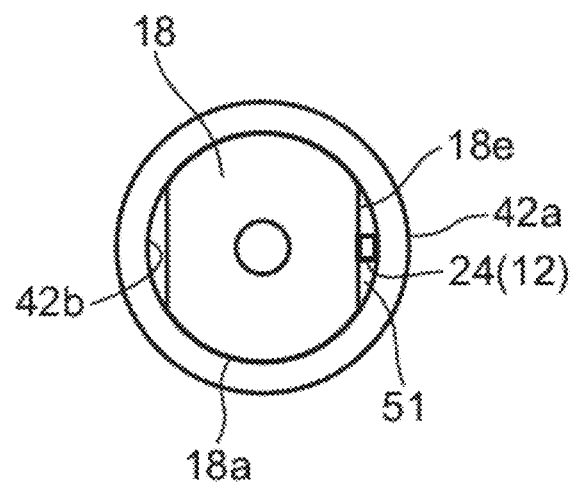
FIG. 7 describes the space between the sensor head and the inner peripheral surface of the sleeve.

As shown in FIG. 7, the sleeve 42*a* defining the inner hole 42*b* has an annular shape, and the sensor head 18 has a disk shape partially cutout. Therefore, a space 51 is formed between the inner peripheral surface of the sleeve 42*a* forming the inner hole 42*b* and the joint surface 18*e* of the sensor head 18. The distal end of the heating wire 12 (the distal end of the extending portion 24) is arranged in this space 51. That is, by forming a flat, joint surface 18*e* on a part of the outer peripheral surface 18*a* of the sensor head 18, the space to arrange the heating wire 12 is kept, and also the heat capacity of the sensor head 18 is ensured. Further, the diameter of the curved surface of the sensor head 18 is slightly smaller than the inner diameter of the inner hole 42*b* of the sleeve 42*a*, so the curved surface is positioned along the inner peripheral surface of the sleeve 42*a*. This allows the sensor head 18 to be arranged straight inside the sleeve 42*a*. Also, it makes it easier for the sensor head 18 to contact the inner peripheral surface of the sleeve 42*a*. Instead of the configuration where the heating wire 12 is arranged in the space 51, the distal end of the non-heating wire 16 may be arranged in the space 51. Further, both the distal end of the heating wire 12 and the distal end of the non-heating wire 16 may be arranged in the spaces 51. In this case, the distal end of the heating wire 12 and the distal end of the non-heating wire 16 are separately arranged in opposing spaces 51.

The housing 44 is preferably made of a rigid metallic material with low thermal conductivity, such as stainless steel. The housing 44 is coupled to the soldering tip 42 so it fits over the proximal end side of the sleeve 42*a*. The housing 44 is provided with a connector 47 having a first terminal 45 connected to the lead wire 14 and a second terminal 46 connected to the non-heating wire 16.

FIGS. 6A and 6B shows an example which the heater-sensor complex 10 installed to a standard type soldering iron tip cartridge 40, however, the configuration is not limited thereto. The heater-sensor complex 10 may be installed to a soldering iron tip cartridge 40 having a higher capacity than a standard soldering iron tip cartridge 40.

Figure 8A:
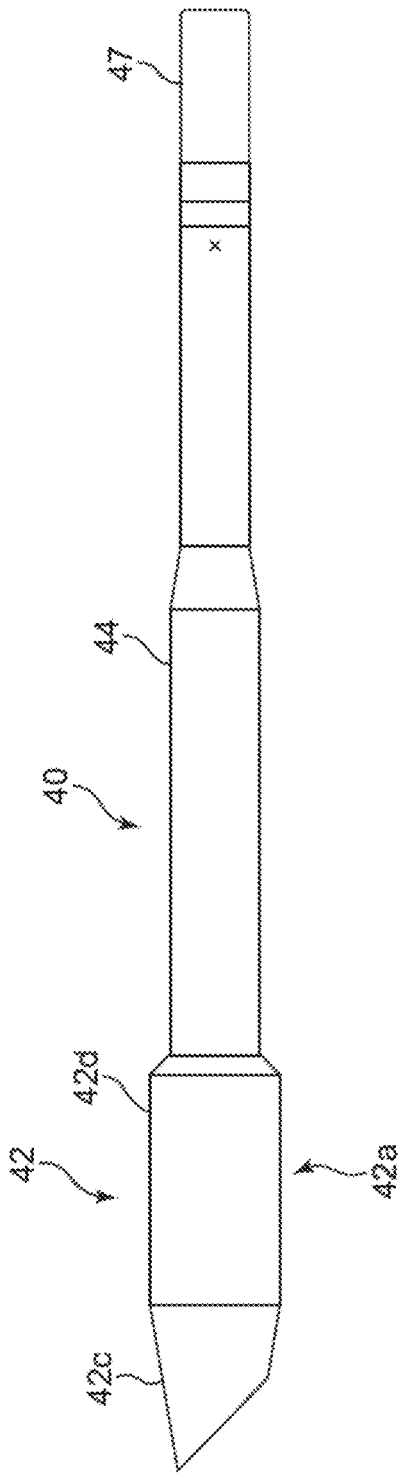
FIGS. 8A and 8B show figures of a high capacity type soldering iron tip cartridge with the heater sensor complex applied according to the embodiment.
Figure 8B:
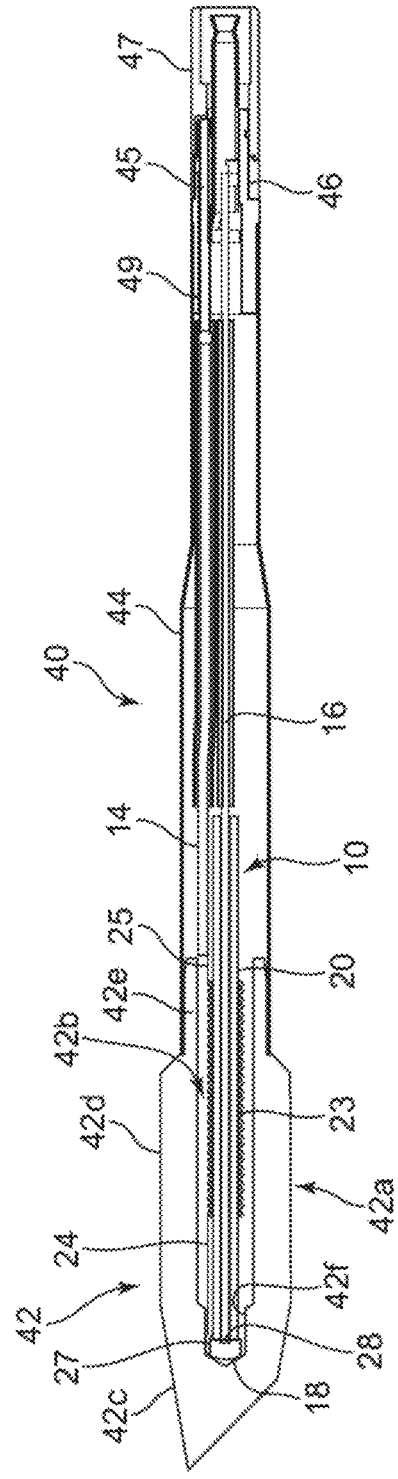

The high-capacity type tip cartridge 40 is shown in FIGS. 8A and 8B. The sleeve 42a of the soldering tip 42 includes, a first portion 42d having the same diameter as the proximal portion of the soldering tip-end 42c, and a second portion 42e continued from the proximal end of the first portion 42d and having a diameter smaller than the first portion 42d. That is, the soldering tip-end 42c has a proximal portion larger in diameter than the proximal portion of the tip-end 42c of the standard type tip cartridge 40, and the first portion 42d has a larger diameter than the sleeve 42a of the standard type tip cartridge 40.

The tip-end 42c has a recess which is recessed down from the inner hole 42b of the sleeve 42a toward the distal side. The recess 42f has a smaller diameter than the inner hole 42b, and the sensor head 18 is arranged in this recess 42f The distal end of the insulation tube 20 is also inserted into the recess 42f. On the other hand, the coil 23 of the heating wire 12 is stored in the inner hole 42b but is not inserted in the recess 42f.

A connector wire 49 having a lower resistivity than the lead wire 14 is connected to the lead wire 14, and the first terminal 45 is connected to the connector wire 49.

Other configurations are the same as the standard type soldering iron tip cartridge 40.

As described above, in the heater-sensor complex 10 of the present embodiment, when voltage is applied between the lead wire 14 and the non-heating wire 16, the heating wire 12 and the non-heating wire 16 are electrically conducted at least through the sensor head 18. At this time, since the heating wire 12 generates heat, the heater-sensor complex 10 functions as a heater. In addition, since the heating wire 12 and the non-heating wire 16 are made of different metals, an thermo-electromotive force corresponding to the temperature difference between, the distal end of the heating wire 12 and the distal end of the non-heating wire 16, and the proximal end of the lead wire 14 and the proximal end of the non-heating wire 16, is generated between the proximal end of the lead wire 14 and proximal end of the non-heating wire 16. The temperature of the distal end of the heating wire 12 and the non-heating wire 16 can be derived from the magnitude of this thermo-electromotive force. Hence, the distal end of the heating wire 12 and the distal end of the non-heating wire 16, which in turn the sensor head 18, will function as temperature detection. At this time, the heating wire 12 and the non-heating wire 16 are conducted through at least the sensor head 18 (which is made of a metal having a lower thermal conductivity than the metal forming the non-heating wire 16). Therefore, when a pulse voltage is applied between the lead wire 14 and the non-heating wire 16, an instantaneous increase in electromotive force (instantaneous temperature increase) due to direct heat from the heating wire 12 is mitigated because the sensor head 18, which has low thermal conductivity and relatively large heat capacity, reduces an influence on the heat from the heating wire 12. Therefore, instantaneous temperature rise of the sensor head 18 is mitigated and the accuracy of temperature control of the heater-sensor complex is improved.

Figure 9:
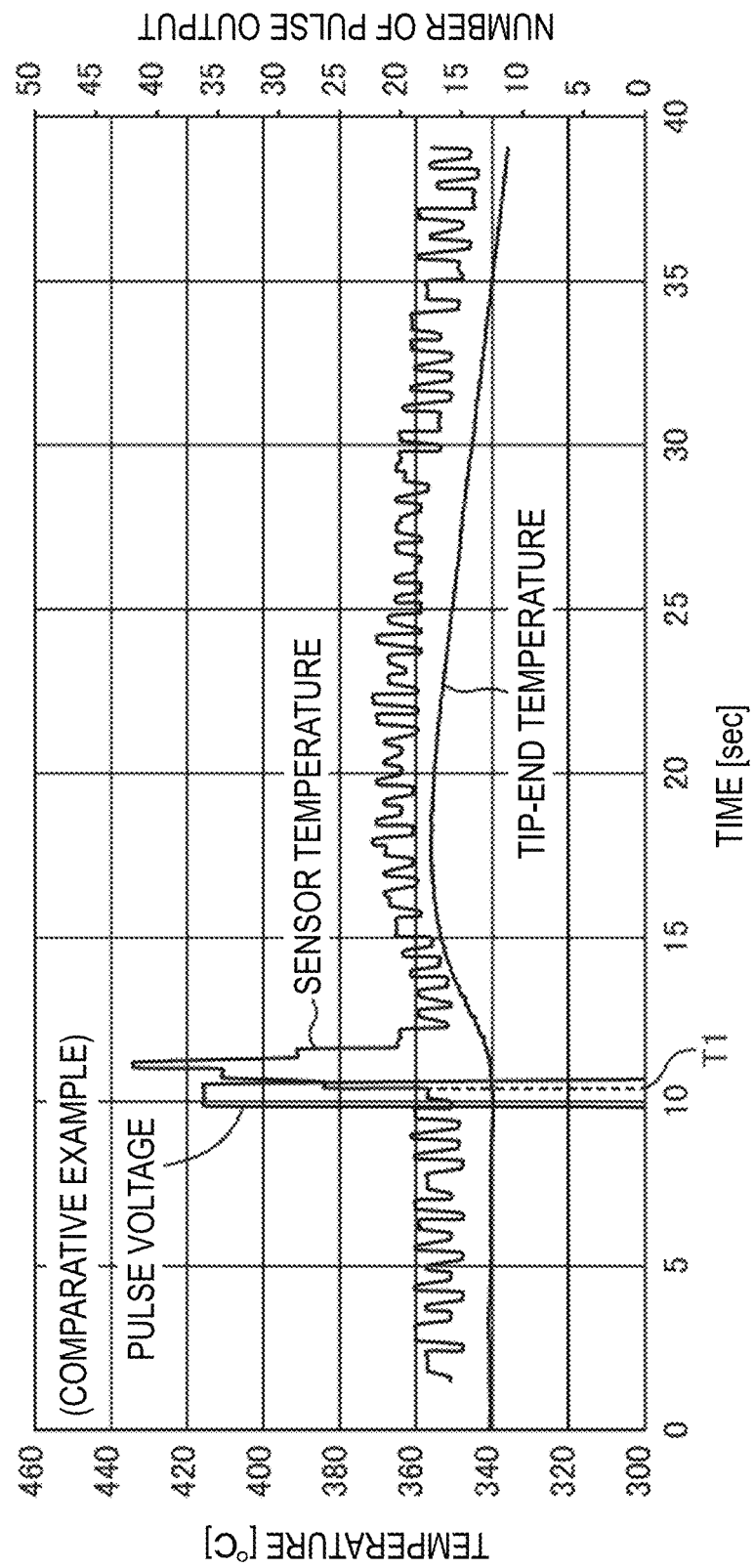
FIG. 9 shows an example of a rise in sensor temperature according to a comparative example.

That is, in the case of a heater-sensor complex as a comparative example (not shown) where the non-heating wire 16 is directly connected to the heating wire 12, when pulse voltage is applied, an instantaneous temperature rise occurs to the joint (the connection of the heating wire 12 and the non-heating wire 16) due to direct heat from the heating wire 12. As a result, an instantaneously increased electromotive force is generated between the proximal end of the lead wire 14 and the proximal end of the non-heating wire 16. For example, FIG. 9 shows one example of the rise of sensor temperature and the temperature change of the soldering tip-end 42c when a heater sensor complex configured with a non-heating wire 16 directly connected to a heating wire 12 is used as a soldering iron tip cartridge. This temperature change is an example of the result when a pulse voltage is applied for about one second. The sensor temperature is the temperature obtained from the thermo-electromotive force measured between the proximal end of lead wire 14 and the proximal end of non-heating wire 16. In FIG. 9, when pulse voltage is applied, an instantaneous increase in electromotive force (instantaneous increase in sensor temperature) occurs between the lead wire 14 and the non-heating wire 16 at time Ti. From this influence, the sensor temperature becomes higher than the soldering tip temperature. Note that the soldering tip temperature described in FIG. 9 is the temperature of the soldering tip-end 42c when measured by an external thermometer. The same applies to FIG. 10 as well.

Figure 10:
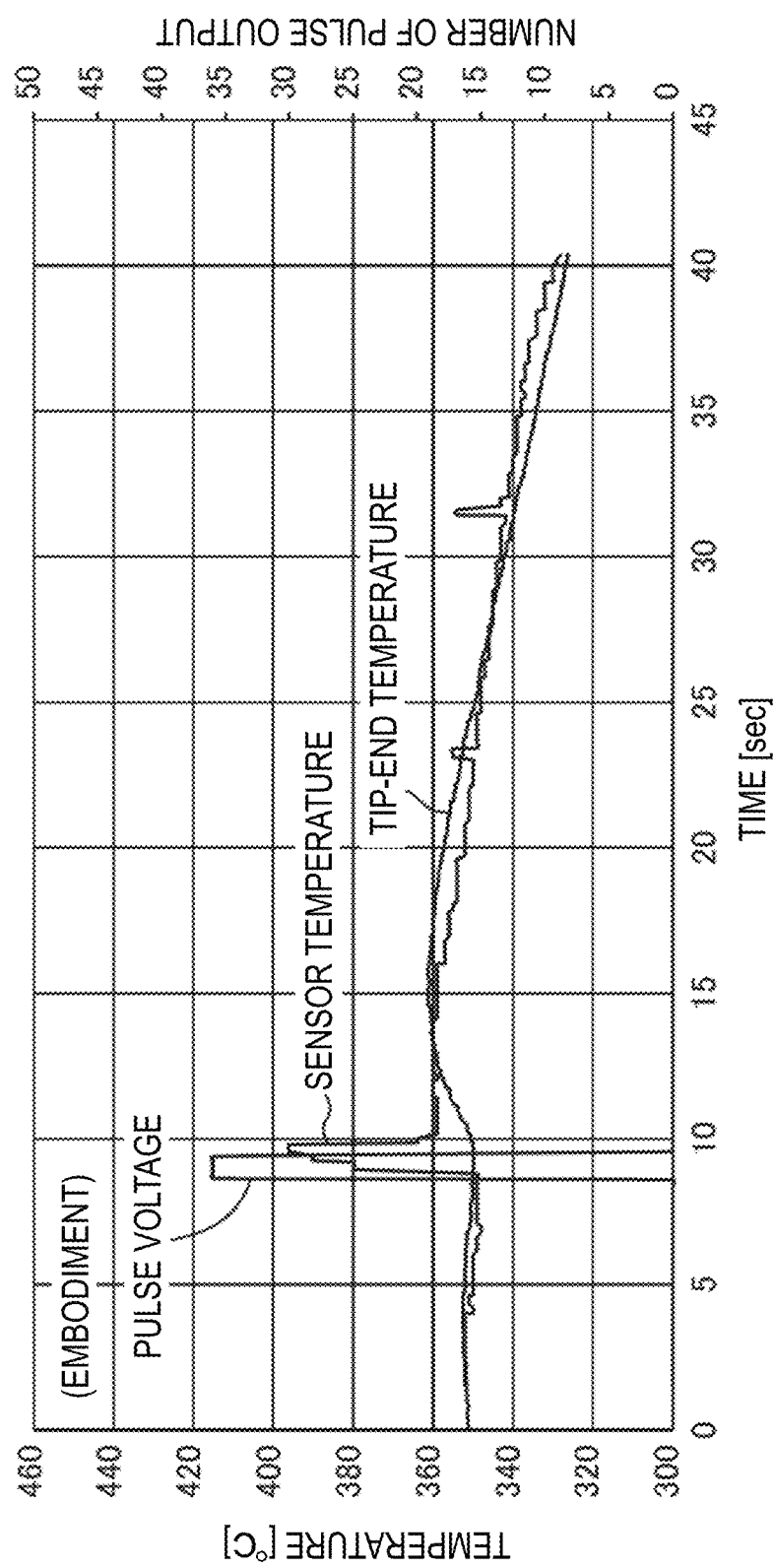
FIG. 10 shows an example of a mitigated rise in sensor temperature according to the embodiment.

In contrast, in the heater-sensor complex 10 of the present embodiment, the heating wire 12 and the non-heating wire 16 are electrically conducted at least through the sensor head 18, so an instantaneous increase in electromotive force (instantaneous rise in sensor temperature) accompanied by the applied pulse voltage, is mitigated. FIG. 10 shows an example of change in sensor temperature which occurs when a pulse voltage is applied to the heater sensor complex 10 of this embodiment. FIG. 10 is also an example of the result when the heater sensor complex 10 is used in a soldering iron tip cartridge. The sensor temperature is the temperature obtained from the electromotive force of the heater-sensor complex 10. In the heater sensor complex 10 of the present embodiment, the instantaneous rise in sensor temperature (instantaneous rise in electromotive force) is suppressed as compared with the comparative example shown in FIG. 9, and also after the instantaneous rise, the influence of heat generation of the heating wire 12 to the sensor temperature is mitigated and the sensor temperature are closer to the soldering tip temperature. Therefore, when performing temperature control with the heater sensor complex 10 of the present embodiment, high accuracy temperature control can be performed by the mitigation of the influence of instantaneous rise in the sensor temperature, and the sensor temperature being close along the actual soldering tip temperature.

Figure 11:
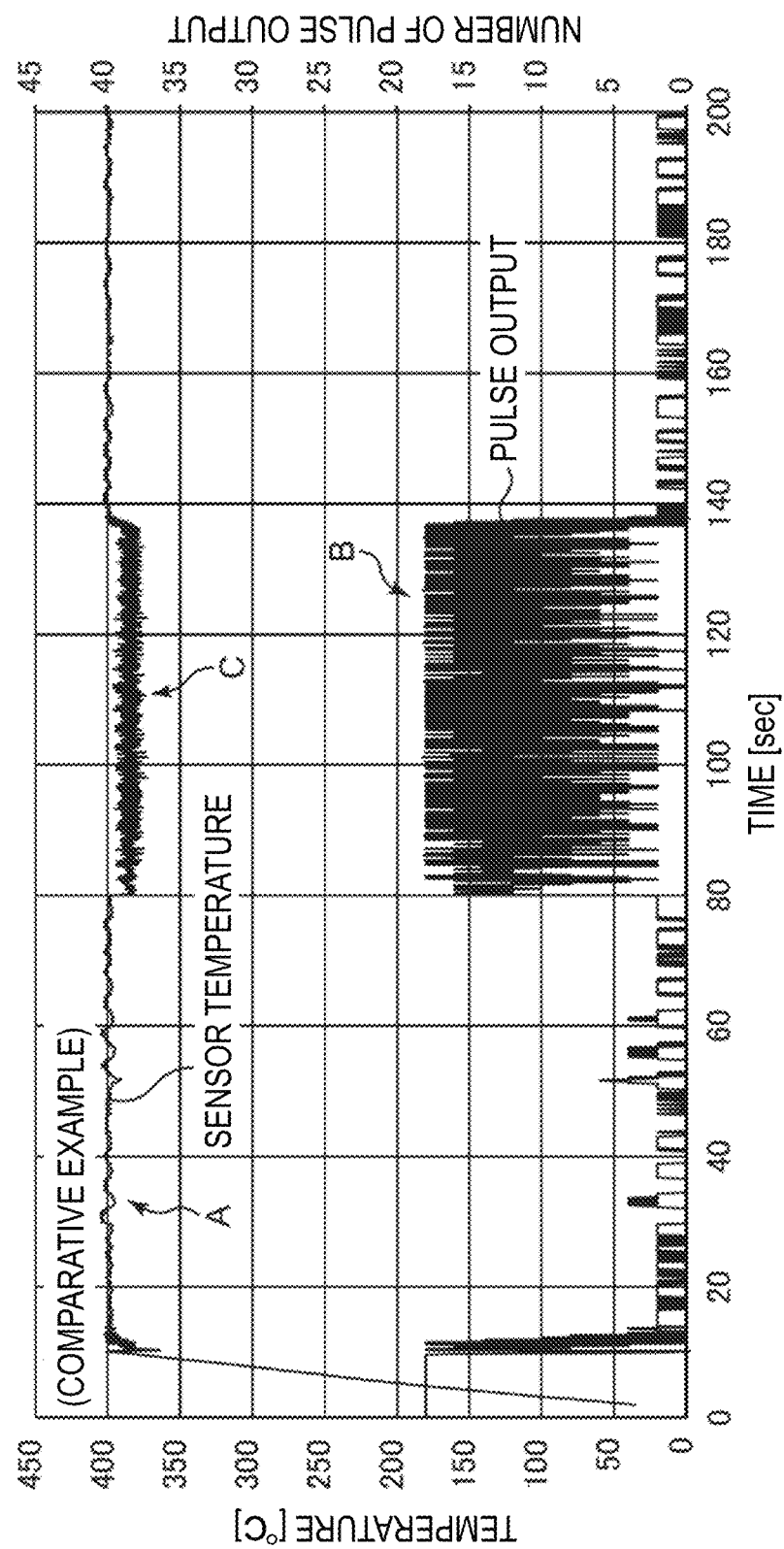
FIG. 11 shows an example of the fluctuation of output pulse and sensor temperature according to a comparative example.
Figure 12:
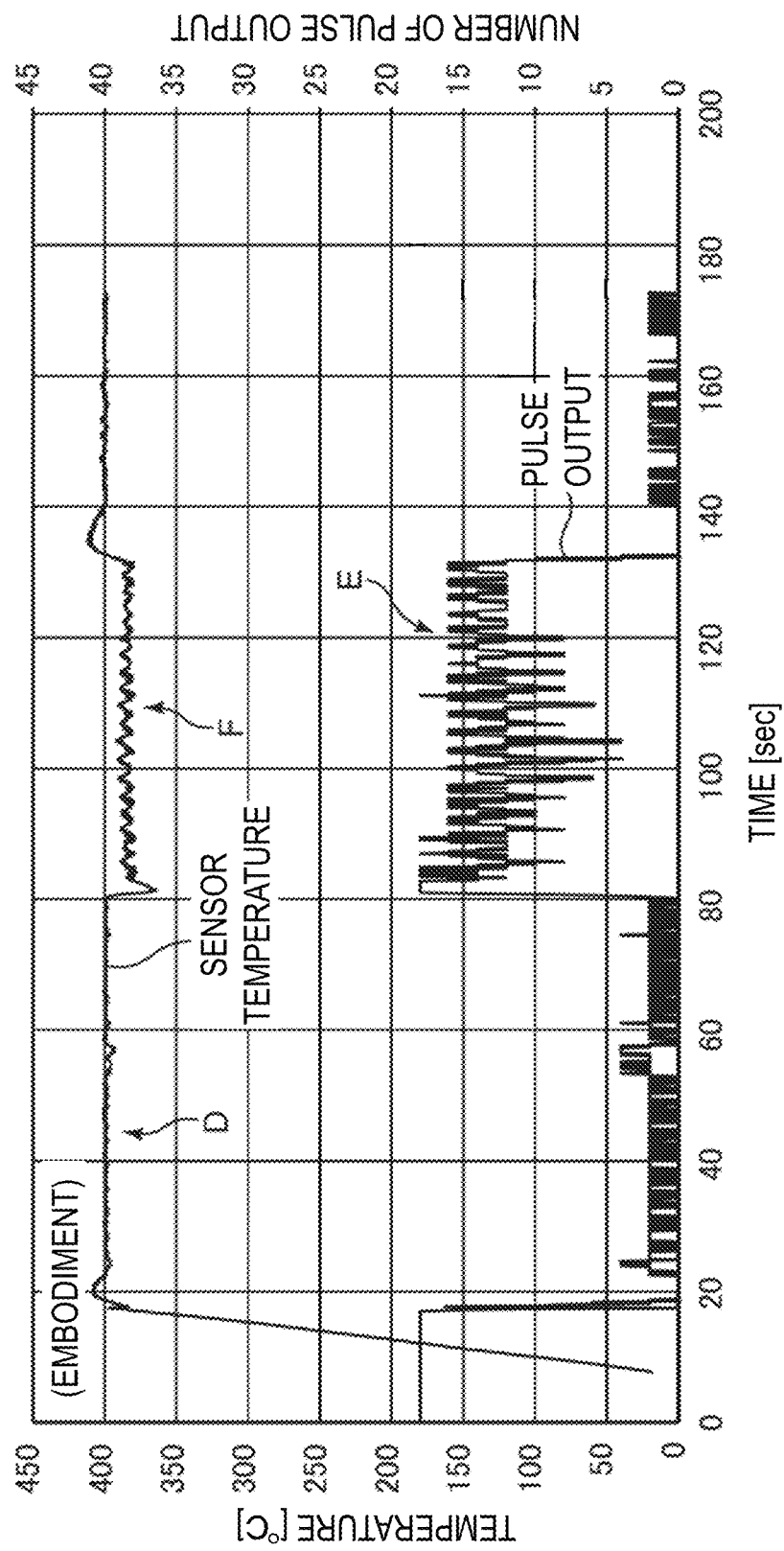
FIG. 12 shows an example of a suppressed fluctuation of output pulse and sensor temperature according to the embodiment.
Figure 13:
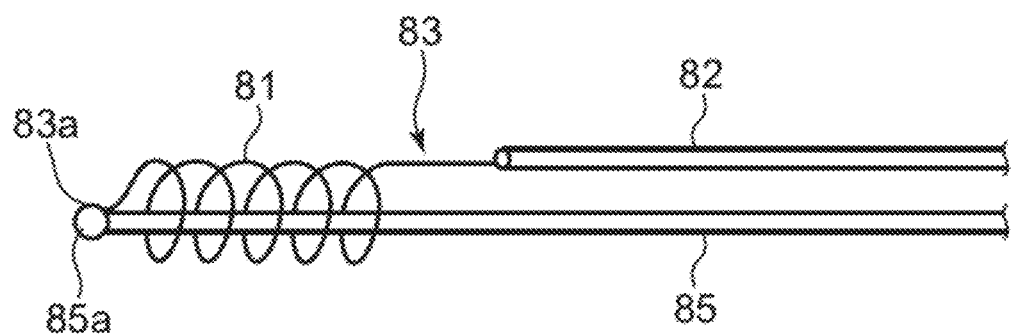
FIG. 13 shows the heater sensor complex disclosed in JPH10-260083A.

Further, when temperature control is performed by adjusting the number of output pulses based on sensor temperature feedback, in the case of a heater sensor complex as a comparative example as shown in FIG. 11, during stable temperature state ("A" in FIG. 11), fluctuation of sensor temperature caused by the heat generation of the heater is seen, and during soldering operation ("C" in FIG. 11), the sensor temperature fluctuates significantly, so the output pulse determined by the sensor temperature also fluctuates significantly, and the output is not stable ("B" in FIG. 11). In contrast, in the case of the heater-sensor complex 10 of the present embodiment as shown in FIG. 12, during stable temperature state, the fluctuation of sensor temperature calculated from the thermo-electromotive force are suppressed ("D" in FIG. 12), and during soldering operation, fluctuation of sensor temperature are suppressed ("F" in FIG. 12) thereby suppressing fluctuation of number of output pulses ("E" in FIG. 12), and the control is stable. Here, FIG. 11 and FIG. 12 is an example of the result when a soldering iron tip cartridge using a heater sensor complex is attached to a handle of a soldering iron, and temperature controlled, and load applied at B and C in FIG. 11 and E and F in FIG. 12.

In the heater-sensor complex 10 of the present embodiment, both the first joint 27 and the second joint 28 are positioned on the same distal side of the heater-sensor complex 10 than the heater coil 23. Therefore, when the coil portion 23 generates heat, the first joint 27 and the second joint 28 are arranged in the region of the same temperature zone. Therefore, the temperature of the sensor head 18 can be accurately obtained from the value of the thermo-electromotive force generated between the lead wire 14 and the non-heating wire 16.

Further, in the heater sensor complex 10 of the present embodiment, at least one of the first joint 27 and the second joint 28 is positioned on the outer peripheral surface 18a of the sensor head 18. Therefore, the structure for connecting the heating wire 12 or the non-heating wire 16 to the sensor head 18 can be made easily. Also, the distance between the first joint 27 and the second joint 28 can be easily maintained.

Further, in the heater sensor complex 10 of the present embodiment, the sensor head 18 is wider (bigger diameter) than the insulation tube 20, so the heat capacity of the sensor head 18 can be increased. Therefore, the sensor head 18 can be functioned effectively. In addition, since the heating wire 12 is isolated from the non-heating wire 16 by the insulation tube 20, short-circuiting between the heating wire 12 and the non-heating wire 16 can be prevented.

Further, in the heater sensor complex 10 of the present embodiment, the sensor head 18 is spaced away from the coil portion 23, and the heating wire 12 has an extending portion 24 extending from the coil portion 23 to the sensor head 18. Therefore, the heat generation from the coil portion 23 is less likely to affect the sensor head 18, and the connection of the heating wire 12 to the sensor head 18 can be ensured.

Still further, in the heater sensor complex 10 of the present embodiment, the joint surface 18e is formed as a flat surface on the outer peripheral surface 18a of the sensor head 18, so the connection of the distal end of the heating wire 12 or the non-heating wire 16 with respect to the sensor head 18 is ensured.

It should be noted that the embodiments disclosed here should be considered as examples and not restrictive in all respects. The present invention is not limited to the embodiments described above, and various modifications and improvements are possible without departing from the scope of the invention. For example, in the embodiment described above, the sensor head 18 is formed to have a width larger than the width (diameter) of the insulating tube 20, but the present invention is not limited to. The width of sensor head 18 may be smaller than the width of insulation tube 20. In this case, the heat capacity of the sensor head 18 can be increased by increasing the thickness of the sensor head 18 (thickness in the axial direction of the insulation tube 20).

What is claimed is:

1. A heater sensor complex comprising:
a heating wire which generates heat with power supplied;
a lead wire constituted by a metal identical to a metal constituting said heating wire and connected to a proximal end of said heating wire, said lead wire having a bigger diameter than said heating wire;
a non-heating wire constituted by a metal different from the metal constituting said heating wire; and
a sensor head constituted by a metal different from the metal constituting said heating wire and the metal constituting said non-heating wire, wherein
said sensor head has a lower thermal conductivity than said non-heating wire,
said sensor head is joined to a distal end of said heating wire and a distal end of said non-heating wire, and
said heating wire and said non-heating wire are conducted through at least said sensor head.

2. The heater sensor complex according to claim 1, wherein
said heating wire includes a coil portion formed in a coiled shape, and
a first joint, which is a portion jointed to said sensor head, of said distal end of said heating wire and a second joint, which is a portion jointed to said sensor head, of said distal end of said non-heating wire are both positioned on a distal side of the heater sensor complex than said coil portion.

3. The heater sensor complex according to claim 1, wherein
at least one of a first joint, which is a portion jointed to said sensor head, of said distal end of said heating wire and a second joint, which is a portion jointed to said sensor head, of said distal end of said non-heating wire are positioned on an outer peripheral surface of said sensor head.

4. The heater sensor complex according to claim 1, wherein
said heating wire includes a coil portion formed in a coiled shape around an insulation tube,
said non-heating wire is inserted through said insulation tube, and
said sensor head has a width wider than said insulation tube.

5. The heater sensor complex according to claim 1, wherein
said heating wire includes a coil portion formed in a coiled shape,
a space is formed between said sensor head and said coil portion, and
said heating wire has an extending portion extending from an end of said coil portion to said distal end of said heating wire.

6. The heater sensor complex according to claim 1, wherein
a joint surface is formed on an outer peripheral surface of said sensor head, said joint surface is configured flat in form, and said distal end of said heating wire or said distal end of said non-heating wire is connected to said joint surface.

7. The heater sensor complex according to claim 1, wherein
said non-heating wire is made from nickel or nickel alloys, and
said sensor head is made from stainless steel or heat-resistant steel.

8. A soldering iron tip cartridge comprising:
a soldering tip;
the heater sensor complex according to claim 1 incorporated to said soldering tip; and
a housing coupled to said soldering tip to accommodate said heater sensor complex.

9. A soldering iron tip cartridge comprising:
a soldering tip;
the heater sensor complex according to claim 2 incorporated to said soldering tip; and a housing coupled to said soldering tip to accommodate said heater sensor complex, wherein said soldering tip has a cylindrical sleeve defining an inner hole, and a soldering tip end formed on a distal end of said sleeve so as to close one end of said inner hole of said sleeve, said coil portion is positioned inside said inner hole, and said first joint and said second joint are arranged at a position on a distal side of the heater sensor complex than said coil portion and in a region having a same temperature zone when said coil portion generates heat.

10. A soldering iron tip cartridge comprising:

a soldering tip;

the heater sensor complex according to claim 6 attached to said soldering tip; and a housing coupled to said soldering tip to accommodate said heater sensor complex, wherein said soldering tip has a cylindrical sleeve defining an inner hole, and a soldering tip end formed on a distal end of said sleeve so as to close one end of said inner hole of said sleeve, and at least one of said distal end of said heating wire and said distal end of said non-heating wire is positioned in a gap formed between said joint surface configured flat in form and an inner peripheral surface of said sleeve defining said inner hole.

11. The heater sensor complex according to claim 1, wherein said heating wire and said non-heating wire are electrically conducted through at least said sensor head.

\* \* \* \* \*